(12) United States Patent
Martin

(10) Patent No.: US 7,913,715 B2
(45) Date of Patent: Mar. 29, 2011

(54) RELIEF VALVE INCLUDING A CHECK VALVE IN A DAMPING CHAMBER

(75) Inventor: Francis J. Martin, Huntington, NY (US)

(73) Assignee: Ausco, Inc., Port Washington, NY (US)

(*) Notice: Subject to any disclaimer, the term of this patent is extended or adjusted under 35 U.S.C. 154(b) by 572 days.

(21) Appl. No.: 11/934,876

(22) Filed: Nov. 5, 2007

(65) Prior Publication Data
US 2009/0114289 A1 May 7, 2009

(51) Int. Cl.
*F16K 21/10* (2006.01)
(52) U.S. Cl. .................. 137/514.7; 137/514.5
(58) Field of Classification Search .............. 137/536, 137/538, 514.5, 514, 514.7
See application file for complete search history.

(56) References Cited

U.S. PATENT DOCUMENTS

| | | | | |
|---|---|---|---|---|
| 524,049 | A * | 8/1894 | Schutte | 137/494 |
| 558,034 | A * | 4/1896 | Brown et al. | 137/514.5 |
| 963,385 | A | 7/1910 | Oleson | |
| 1,291,609 | A | 1/1919 | Nichols | |
| 1,466,171 | A * | 8/1923 | Jacobsen | 137/514.5 |
| 1,684,987 | A * | 9/1928 | Hazard | 137/514.5 |
| 2,197,455 | A * | 4/1940 | Volpin | 137/514.5 |
| 2,411,930 | A * | 12/1946 | Mathys | 137/470 |
| 2,772,690 | A * | 12/1956 | Mercier et al. | 137/119.04 |
| 2,969,084 | A * | 1/1961 | Raymond | 137/471 |
| 3,487,852 | A * | 1/1970 | Kikendall | 137/514.5 |
| 3,680,587 | A * | 8/1972 | Herscovici | 137/514.3 |
| 4,217,931 | A * | 8/1980 | Jaekel | 137/606 |
| 5,678,604 | A | 10/1997 | Plauborg et al. | |
| 5,707,309 | A | 1/1998 | Simpson | |
| 5,752,546 | A | 5/1998 | Yamashita et al. | |
| 5,878,647 | A | 3/1999 | Wilke et al. | |
| 5,927,323 | A * | 7/1999 | Kikuchi et al. | 137/514.5 |
| 6,443,182 | B1 * | 9/2002 | Hathcock | 137/514.5 |

OTHER PUBLICATIONS

International Search Report dated Jan. 21, 2009 for International Application No. PCT/US 08/82468.

* cited by examiner

*Primary Examiner* — John Rivell
*Assistant Examiner* — Macade Brown
(74) *Attorney, Agent, or Firm* — F. Chau & Associates, LLC

(57) ABSTRACT

A relief valve includes a body, a damping chamber in the body, a poppet in the body, wherein the poppet includes an end in the damping chamber, and a check valve in the damping chamber. The damping chamber is located adjacent an inlet side of the relief valve, and the check valve includes a sealing member to prevent fluid flow into the damping chamber at the inlet side. The sealing member is unseated during opening of the poppet to permit fluid to flow into the damping chamber at the inlet side.

16 Claims, 2 Drawing Sheets

RELIEF VALVE INCLUDING A CHECK VALVE IN A DAMPING CHAMBER

BACKGROUND OF THE INVENTION

1. Technical Field

The present disclosure relates to a relief valve, and, more particularly, to a hydraulic relief valve including a check valve in a damping chamber.

2. Discussion of the Related Art

A relief valve controls fluid pressure in a system, such as a hydraulic circuit. A relief valve may be used in a system for hydraulic controls, such as in the aerospace industry. In addition to oil, a relief valve may be used in a system carrying other liquids or gas, such as steam.

Pressure can increase in a system as a result of process upset, and/or instrument or equipment failure. Excess pressure build up may be relieved by causing the fluid to flow through an auxiliary outlet out of the system to, for example, a hydraulic tank.

A relief valve opens at a predetermined fluid pressure, for example, based on the design constraints of equipment being protected by the relief valve. This minimum pressure is referred to as the valve cracking pressure. A relief valve may be designed to open at a predetermined cracking pressure.

A relief valve may include a spring attached to a poppet, which provides a force on the poppet to maintain the relief valve in the closed position. Once the cracking pressure is achieved, the poppet is unseated and opens, compressing the spring. When the pressure of the flow traveling through and on portions of the relief valve decreases, for example, to less than the cracking pressure, the relief valve closes to prevent further flow through the valve.

The speeds at which a relief valve opens and closes are important for increasing fatigue life of a hydraulic system. For example, a fast opening relief valve limits high pressure pulses in the hydraulic system, and a slow closing relief valve provides valve stability.

Accordingly, there is a need for a valve construction that permits a relief valve poppet to open relatively quickly, and to close at a relatively slow rate.

SUMMARY OF THE INVENTION

Embodiments of the present invention provide a relief valve including a check valve in a damping chamber configured to enable fast opening and slow closing of a relief valve poppet.

A relief valve, in accordance with an embodiment of the present invention, comprises a body, a damping chamber in the body, a poppet in the body, wherein the poppet includes an end in the damping chamber, and a check valve in the damping chamber.

At least a portion the check valve may be formed inside at least part of the poppet located in the damping chamber. The check valve may include a spring formed inside the part of the poppet.

The check valve may be connected to the end of the poppet in the damping chamber. The damping chamber and the poppet may be linearly arranged with respect to each other. The check valve and the poppet may be linearly arranged with respect to each other.

The damping chamber may be located in a direction opposite to an opening direction of the poppet to retard a speed of closure of the poppet. The damping chamber may be located adjacent an inlet side of the relief valve, and the check valve includes a sealing member to prevent fluid flow into the damping chamber at the inlet side.

The sealing member may be unseated during opening of the poppet to permit fluid to flow into the damping chamber at the inlet side. The sealing member may be re-seated after the poppet opens to prevent fluid flow out of the damping chamber at the inlet side.

A valve assembly, in accordance with an embodiment of the present invention, comprises a body, a damping chamber in the body, a poppet in the body, wherein part of the poppet is included in the damping chamber, and a check valve in the damping chamber.

At least a portion the check valve may be formed inside the poppet. The check valve may include a spring formed inside the poppet.

The check valve may be connected to the part of the poppet in the damping chamber.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the present invention now will be described more fully hereinafter with reference to the accompanying drawings. This invention may, however, be embodied in many different forms and should not be construed as limited to the embodiments set forth herein.

Figure 1:
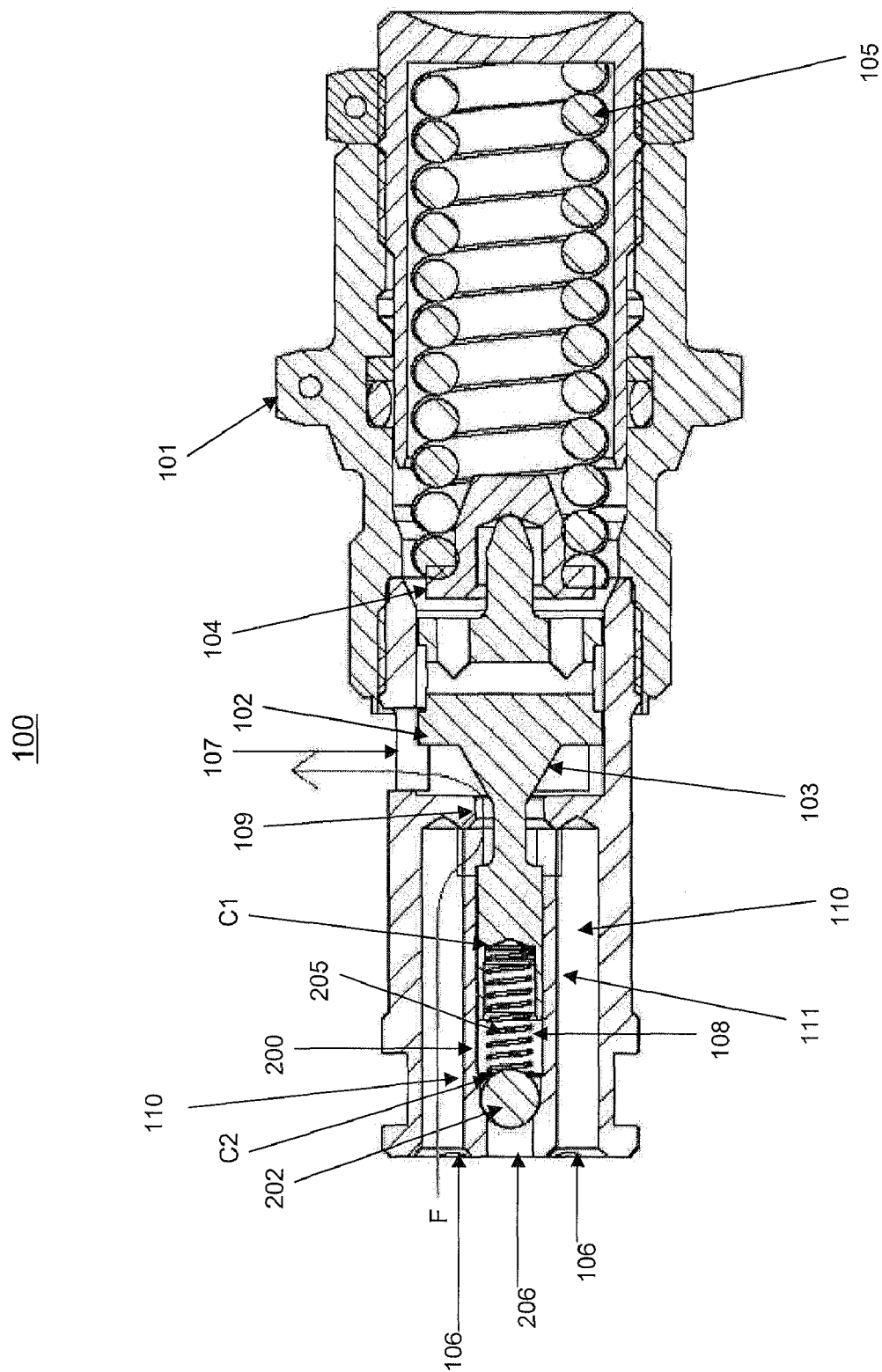
FIG. 1 is a cross-sectional view of a relief valve including a check valve, wherein the relief valve is in the open position, according to an embodiment of the present invention.
Figure 2:
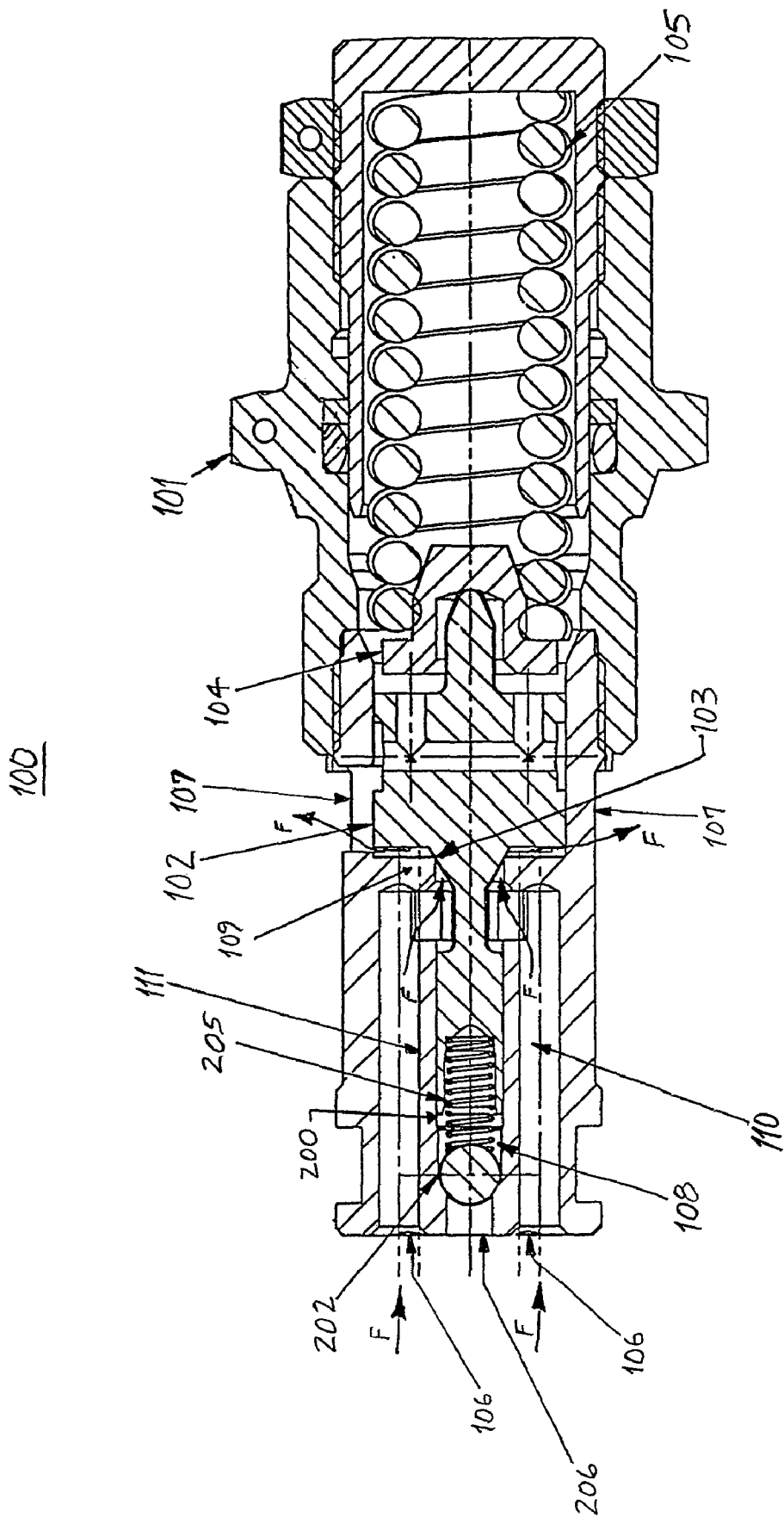
FIG. 2 is a cross-sectional view of a relief valve including a check valve, wherein the relief valve is in the closed position, according to an embodiment of the present invention.

Turning now to FIGS. 1-2, a hydraulic relief valve 100 includes a body 101 including a poppet 102 having a seat 103 and a sprint 105 connected to the poppet 102 formed in the body 101. The seat 103 rests on an inner wall portion 109 of the valve 100 when in the closed position to create a seal.

The poppet 102 is connected to the spring 105 via a retainer 104. The spring 105 keeps the poppet 102 seated until the fluid flowing into the valve 100 (as indicated by arrows F) exerts a predetermined cracking pressure on the seat 103.

A fluid, such as oil, flowing into the valve 100 through inlet 106 (as shown by arrows F), applies pressure to the poppet 102 at the seat 103. When the applied pressure reaches a cracking pressure, the poppet 102 is unseated and compresses the spring 105. As a result, the valve is opened, thereby permitting the fluid to flow to the outlets 107. The fluid flows sequentially through inlet 106, to under the inner wall portion 109, and out through the outlets 107. The outlets 107 may lead to, for example, a hydraulic tank. Once the fluid pressure decreases to the valve's re-seating pressure, the spring 105 is no longer compressed, enabling the poppet 102 is be re-seated, so as to prevent further flow through the relief valve 100.

A damping chamber 108 is provided in the body 101 to allow the relief valve 100 to close slowly and, thereby increase valve stability. When the poppet 102 is unseated, in addition to being permitted to flow to the outlets 107, fluid flows into the damping chamber 108, via the opening of the check valve for rapid poppet 102 opening. When the poppet 102 starts to close, the fluid in the damping chamber 108 provides a damping effect, causing the poppet 102 to reseat at a slower rate than when there is no fluid in the path of the poppet 102. A conduit 110 is located around the wall 111 of the damping chamber 108. The conduit 110 extends from inlet 106 to permit fluid to flow to the seat 103 of the poppet 102.

A check valve 200 is incorporated into the damping chamber 108. The check valve 200 permits the poppet 102 to open fast on pressure pulses at the inlet 106. As the poppet 102 is urged open due to increasing pressure at the inlet 106, and at the seat 103, the check valve 200 also opens to permit fluid to flow into the damping chamber 108 at the inlet side of the relief valve 100 through inlet 206. In other words, when the poppet is opening, the ball 202 is unseated to open the seal at the inlet 206. As a result, fluid flows into the damping chamber 108 through inlet 206 and the open seal.

The flow of fluid into the damping chamber 108, and resulting pressure on the poppet 102, causes the poppet 102 to open faster than without a check valve in the damping chamber 108. Fast opening of the poppet 102 limits high pressure pulses and the consequent rise in system pressure. The ball 202 is unseated during opening of the poppet 102, but is seated when the relief valve is in a steady-state open or closed position, as shown in FIGS. 1 and 2. In other words, the seal is open when the poppet 102 is moving to the open position, and, when the poppet 102 reaches the open position, the ball 202 is re-seated to close the check valve 200 and prevent fluid flow out through inlet 206. The closed check valve 200 prevents a rapid egress of fluid from the damping chamber 108 to provide the damping effect when the poppet 102 starts to close due to decreasing inlet pressure.

Therefore, valve stability is accomplished by the damping chamber 108, which limits the closing speed of movement of the poppet 102. In addition, the check valve 200, which is incorporated in the damping chamber 108, permits free flow of fluid into the damping chamber 108 when the ball 202 is unseated, but closes to prevent free flow of fluid out of the damping chamber 108 when the ball 202 is re-seated. As a result, the poppet 102 can respond (open) quickly on increasing inlet pressure, but the retardation (damping) of poppet closure is still provided.

Incorporating the check valve 200 in the damping chamber 108 minimizes valve size, increases the relief valve's speed of response, and shortens the damping fluid flow path since the fluid is coming in directly at the inlet side as opposed to at the outlet side. As can be seen in FIGS. 1 and 2, at least a portion of the check valve 200 is formed inside the end of the poppet 102 that is located in the damping chamber 108. Accordingly, the end of the poppet 102 located in the damping chamber 108 includes an open hollowed portion therein in which part of the check valve spring 205 is located and attached to the poppet at for example, C1. Alternatively, the check valve 200 can be formed adjacent the poppet 102 as an extension of the end of the poppet 102 that is located in the damping chamber 108.

The ball 202 of the check valve 200 opens at a predetermined cracking pressure, and will re-seat upon the pressure reaching the check valve's re-seating pressure. The check valve 200 includes the spring 205 attached to the ball 202 at for example, C2, which provides a force on the ball 202 to maintain the check valve in the closed position.

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:

1. A relief valve, comprising:
a body;
a damping chamber in the body;
a poppet in the body, wherein the poppet includes an end in the damping chamber; and
a check valve in the damping chamber, wherein:
the body includes a first inlet through which fluid flows to a seat of the poppet;
the body includes a second inlet facing the same direction as the first inlet, through which the fluid flows into the damping chamber;
the check valve includes a sealing member sealing the second inlet,
the sealing member and the poppet are connected to each other and are biased in the same direction, and
the connection between the poppet and sealing member causes the sealing member to unseat when the poppet unseats so that the fluid enters into damping chamber and exerts pressure on the poppet in an opening direction of the poppet.

2. The relief valve of claim 1, wherein at least a portion the check valve is formed inside at least part of the poppet located in the damping chamber.

3. The relief valve of claim 2, wherein the check valve includes a spring formed inside the part of the poppet.

4. The relief valve of claim 1, wherein the check valve is connected to the end of the poppet in the damping chamber.

5. The relief valve of claim 4, wherein the damping chamber and the poppet are linearly arranged with respect to each other.

6. The relief valve of claim 4, wherein the check valve and the poppet are linearly arranged with respect to each other.

7. The relief valve of claim 1, wherein the damping chamber is located in a direction opposite to an opening direction of the poppet to retard a speed of closure of the poppet.

8. The relief valve of claim 7, wherein the damping chamber is located adjacent an inlet side of the relief valve, and the sealing member prevents fluid flow into the damping chamber at the inlet side.

9. A valve assembly, comprising:
a body;
a damping chamber in the body;
a poppet in the body, wherein part of the poppet is included in the damping chamber; and
a check valve in the damping chamber, wherein:
the body includes a first inlet through which fluid flows to a seat of the poppet;
the body includes a second inlet facing the same direction as the first inlet, through which the fluid flows into the damping chamber;
the check valve includes a sealing member sealing the second inlet,
the sealing member and the poppet are connected to each other and are biased in the same direction, and
the connection between the poppet and sealing member causes the sealing member to unseat when the poppet unseats so that the fluid enters into damping chamber and exerts pressure on the poppet in an opening direction of the poppet.

10. The valve assembly of claim 9, wherein at least a portion the check valve is formed inside the poppet.

11. The valve assembly of claim 10, wherein the check valve includes a spring formed inside the poppet.

12. The valve assembly of claim 9, wherein the check valve is connected to the part of the poppet in the damping chamber.

13. The valve assembly of claim 12, wherein the damping chamber and the poppet are linearly arranged with respect to each other.

14. The valve assembly of claim 12, wherein the check valve and the poppet are linearly arranged with respect to each other.

15. The valve assembly of claim 9, wherein the damping chamber is located in a direction opposite to an opening direction of the poppet to retard a speed of closure of the poppet.

16. The valve assembly of claim 15, wherein the damping chamber is located adjacent an inlet side of the valve assembly, and the sealing member prevents fluid flow into the damping chamber at the inlet side.

* * * * *